United States Patent [19]

Cohen et al.

[11] 3,749,997

[45] July 31, 1973

[54] MULTI-SPEED POTENTIOMETER SERVO

[75] Inventors: Richard L. Cohen, Old Bridge; Robert G. Taylor, Wayne, both of N.J.

[73] Assignee: The Bendix Corporation, Teterboro, N.J.

[22] Filed: Mar. 31, 1971

[21] Appl. No.: 129,830

[52] U.S. Cl. .................. 318/592, 318/665, 318/684
[51] Int. Cl. ........................................... G05b 11/18
[58] Field of Search ............ 318/665, 684, 592–595

[56] References Cited
UNITED STATES PATENTS

| 3,051,881 | 8/1962 | Baudin | 318/592 |
| 2,864,044 | 12/1958 | Pardee, Jr. | 318/665 X |
| 3,431,474 | 3/1969 | Van Ostrand | 318/665 X |
| 2,861,233 | 11/1958 | McKeown | 318/665 |
| 3,196,429 | 7/1965 | Gross et al. | 318/665 X |
| 3,254,283 | 5/1966 | Hunt | 318/665 X |
| 2,938,174 | 5/1960 | Bulleyment | 318/684 X |

Primary Examiner—T. E. Lynch
Attorney—Anthony F. Cuoco and Plante, Hartz, Smith & Thompson

[57] ABSTRACT

Amu multi-speed digital servo system uses coarse and fine error signals. The coarse error signal is modified and the fine error signal which is provided by combining a command signal with a feedback signal from a digital, continuous potentiometer is limited. The modified and limited signals are mixed to provide desired servo operation.

5 Claims, 4 Drawing Figures

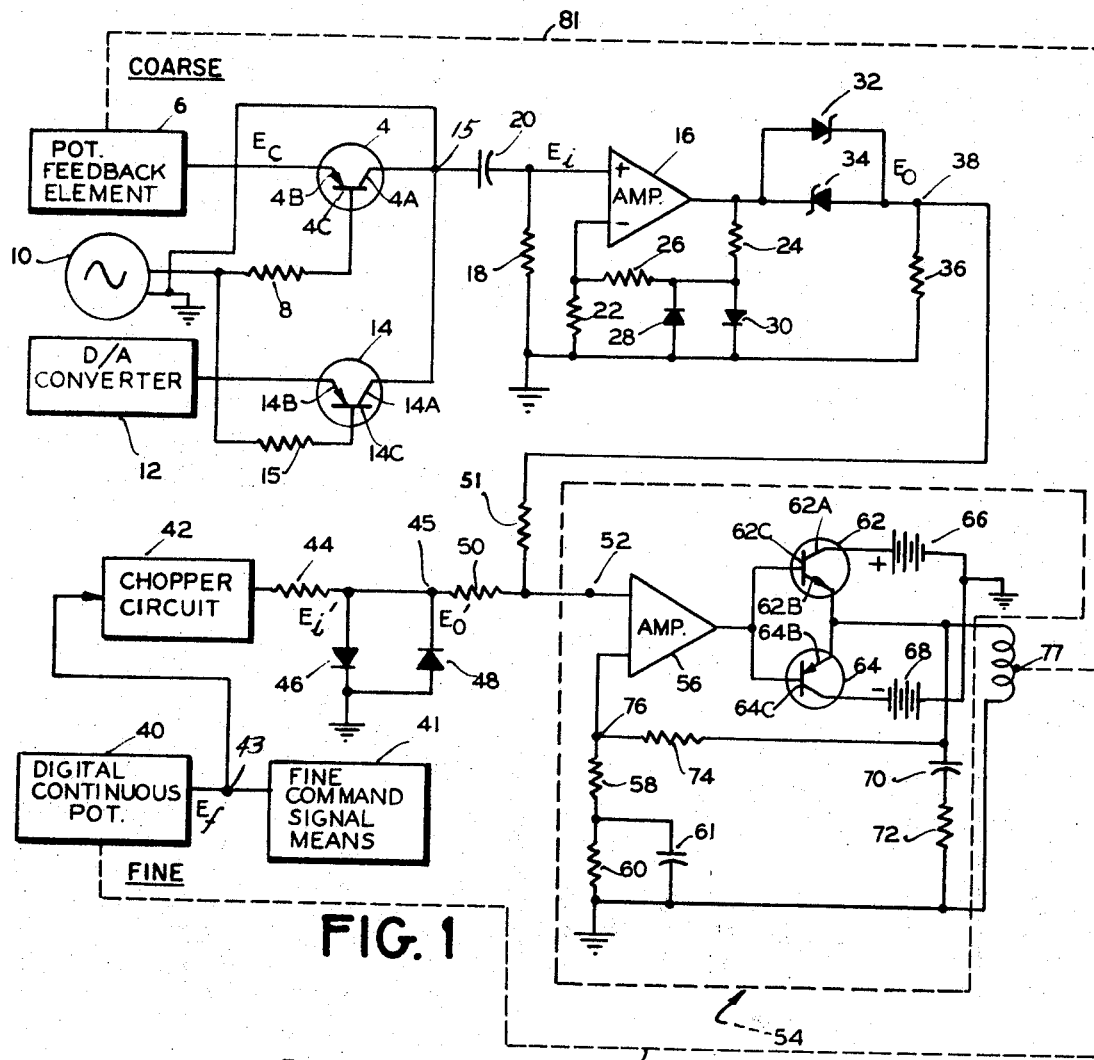
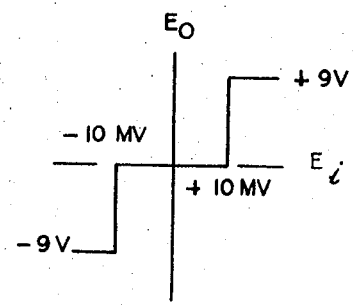
FIG. 2A
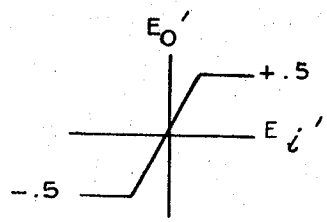
FIG. 2B
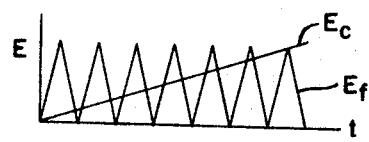
FIG. 3
INVENTORS
RICHARD L. COHEN
ROBERT G. TAYLOR
BY
ATTORNEY

MULTI-SPEED POTENTIOMETER SERVO

CROSS REFERENCE TO RELATED APPLICATIONS

This invention uses a digital continous potentiometer feedback element such as described in copending U. S. Application Ser. No. 127,908, filed Mar. 25, 1971 by Richard L. Cohen, Harold Moreines and Walter Parfomak, and assigned to The Bendix Corporation, assignee of the present invention and now U.S. Pat. No. 3,662,246.

BACKGROUND OF THE INVENTION

1. Field of the Invention

This invention relates to multi-speed servo systems and particularly to servo systems using coarse and fine error signals. More particularly, this invention relates to servo systems of the type described wherein a digital, continuous potentiometer is used as a fine signal feedback transducer.

2. Description of the Prior Art

Multi-speed digital servo systems utilizing coarse and fine error signals for driving aircraft instrumentation are considerably more accurate than their single speed counterparts, but require a continuous element for the fine signal feedback transducer. Until the present invention synchros or shaft encoders have been utilized for this purpose. However, with the advent of the digital continuous potentiometer such as described in the referenced copending U. S. Pat. No. 3,662,246, a potentiometer feedback element has become feasible and, moreover, offers several distinct advantages. For example, simple digital to analog conversions may be made as contrasted to the formerly required and more costly digital to synchro conversions. Additionally, there is no theoretical limit to the number of speeds that the system can have and only one digital interface with sample and hold analog memories is required as opposed to the more complicated digital transfer logic and hold registers which have heretofore been necessary.

SUMMARY OF THE INVENTION

This invention contemplates a servo system using coarse and fine error signals and including means for limiting the fine error signal, and which signal is provided by combining a command signal with a feedback signal from a continuous potentiometer. The coarse error signal is converted to a signal at a predetermined frequency which is blocked as long as it is below a predetermined level. When the level is exceeded a signal is provided at the predetermined frequency and at a level that will completely override the fine error signal so that the coarse signal will control until the fine signal is close enough to final value to assume control.

One object of this invention is to provide a multi-speed servo system utilizing coarse and fine error signals, and wherein the fine error signal is provided by combining a feedback signal from a continuous potentiometer with a fine command signal.

Another object of this invention is to provide a servo system of the type described wherein there is no theoretical limit to the number of servo speeds.

Another object of this invention is to provide a servo system of the type described wherein the coarse error signal overrides the fine error signal to control the system until the fine error signal is close enough to final value to assume control.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWINGS

FIG. 1 is a combination block diagram-electrical schematic of a multi-speed servo system according to the invention.

FIG. 2A is a graphical representation of a coarse error signal modified according to the invention.

FIG. 2B is a graphical representation of a fine error signal limited according to the invention.

FIG. 3 is a graphical representation showing fine feedback signal ($E_f$) and course feedback signal ($E_c$) wave forms.

DESCRIPTION OF THE INVENTION

A conventional type potentiometer type feedback element 6 provides a coarse servo feedback signal $E_c$ and is connected to an emitter element 4B of a transistor 4. Transistor 4 has a base element 4C connected through a resistor 8 to an a.c. signal source 10, and which a.c. signal source provides a driving signal for the transistor. A collector element 4A of transistor 4 provides a return path for the driving signal.

A digital to analog converter 12 provides a coarse servo command signal. A transistor 14 has an emitter element 14B connected to digital to analog converter 12 and a base element 14C connected through a resistor 15 to a.c. signal source 10 for being driven by the signal therefrom. Transistor 14 has a collector element 14A which provides a return path for the driving signal. A coarse error signal is provided at a combining point 15.

An operational amplifier 16 has a non-inverting input terminal (+) connected to collector 4A of transistor 4 and to collector 14A of transistor 14 through a grounded resistor 18 and a coupling capacitor 20. An inverting input terminal (−) of amplifier 16 is grounded through a resistor 22.

A feedback loop connected to an output terminal of amplifier 16 and to the inverting (−) input terminal of the amplifier includes a resistor 24 and a resistor 26 grounded through resistor 22. Diodes 28 and 30 are connected in parallel opposing relation intermediate resistors 24 and 26 and are connected to ground. Zener diodes 32 and 34 are connected in parallel opposing relationship to the output terminal of amplifier 16 and are grounded through a resistor 36.

The aforenoted circuitry provides a modified coarse error signal $E_o$ at an output terminal 38. The modified coarse error signal has a wave form as shown in the graphical representation of FIG. 2A, the generation of which wave form will be hereinafter explained.

A digital continuous feedback potentiometer 40, which may be of the type described in the aforenoted copending U. S. Pat. No. 3,662,246, provides a fine feedback signal $E_f$. Signal $E_f$ may be of the type having a saw-tooth wave form which rises from zero to maximum volts for 0° to 180° displacement of the potentiometer arm and repeats the excursion from zero to maximum for 180° - 360° displacement of the potentiometer arm, the same being described in the above mentioned U. S. Application.

Signal $E_f$ is combined at a combining point 43 with a fine command signal from a fine command signal means 41 to provide a fine error signal and the error signal is applied to a chopper circuit 42. Chopper circuit 42 converts the combined signal to an a.c. signal and amplifies and demodulates said signal, and accordingly may be a device such as described at page 359, *Electronics for Scientists*, Malmstedt et al., Benjamin, 1963.

Chopper circuit 42 is connected through a resistor 44 and diodes 46 and 48 connected in parallel opposing relation across the chopper circuit to provide at an output terminal 45 a limited fine error signal $E_o'$ having a wave form as shown in the graphical representation of FIG. 2B, the generation of which wave form will be hereinafter described.

Output terminal 45 is connected to output terminal 38 through a resistor 50 and a resistor 51 and is connected through resistor 50 to an input terminal 52 of a servo amplifier designated generally by the numeral 54. Servo amplifier 54 includes an amplifier 56 having an input terminal connected to terminal 52 and another input terminal connected to ground through resistors 58 and 60. A capacitor 61 is connected across resistor 60 and ground. The servo amplifier amplifies the signal at terminal 52 in both voltage and power which provides a driving signal for driving a servo motor and in this respect the system is of the conventional type such as described at page 84 (FIG. 119), *Synchros and Servomechanisms*, Philco Corp., 1954. The servo loop is closed by a suitable mechanical connection 81 between servo motor 77 and course potentiometer feedback element 6 and by another suitable mechanical connection 85 between servo motor 77 and fine potentiometer 40. Mechanical connections 81 and 85 may be, for purposes of illustration, gear trains as is well known in the art.

An output terminal of amplifier 56 is connected to a base 62C of a transistor 62 and to a base 64C of a transistor 64. Transistor 62 has an emitter element 62B connected to an emitter element 64B of transistor 64. A collector element 62A of transistor 62 is connected to a suitable source of positive direct current shown as a battery 66 and a collector element 64A of transistor 64 is connected to a suitable source of negative direct current shown as a battery 68. Emitter elements 62B and 64B are connected to ground through a capacitor 70 and a resistor 72. The emitters are connected through a resistor 74 to a point 76 intermediate the other grounded terminal of amplifier 56 and resistor 58. A servo motor coil 77 is connected in parallel with capacitor 70 and resistor 72.

OPERATION OF THE INVENTION

The coarse and fine error signals provided by combining coarse feedback signal $E_C$ and fine feedback signal $E_f$ with the respective command signals are mixed as shown in FIG. 1 to obtain proper servo operation. The fine error signal is limited by the circuitry including resistor 44 and diodes 46 and 48 so that for an input signal $E_t'$ the maximum level of the output signal $E_o'$ is, for example ± .5 volts as shown in FIG. 2B. The coarse error signal is converted by transistors 4 and 14 to, for example, a 400 HZ signal and this latter signal is modified by the circuitry including amplifier 16, diodes 28 and 30 and zener diodes 32 and 34 to provide a signal at point 38 which is either at zero or ± 9 volts as shown in FIG. 2A.

Amplifier 16 and its associated circuitry provides no output as long as the input signal thereto is less than for example, 10 millivolts. However, when the input signal ($E_i$) is greater than 10 millivolts, the output signal ($E_o$) will be a 9 volt, 400 HZ signal that will completely override any fine error signal. The result will be that the coarse error signal is the controlling signal until the fine error signal is close enough to a final value to assume control. The operation of amplifier 16 will be better understood if it is considered that when $E_t$ is less than 10 millivolts the output of the amplifier will be less than the breakdown voltage of zener diodes 32 and 34 and $E_O$ will be zero. When $E_t$ is greater than 10 millivolts, the voltage across diodes 28 and 30 is clamped to the diode voltage thereby preventing normal feedback action. The gain of amplifier 16, therefore, will increase to its open loop value.

From the aforegoing description of the invention it will be seen that a new concept in multi-speed servo systems is provided. The principle feature of the invention is that it eliminates synchro error transducers or shaft encoders which add to the complexity and cost of the apparatus. The device of the invention, in obviating the need for this circuitry, provides a simpler more economical system.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A multi-speed servo system comprising:
   means for providing a fine error signal;
   means for providing a coarse error signal;
   means connected to the fine error signal means for limiting the signal therefrom;
   means connected to the coarse error signal means for modifying the signal therefrom to provide a signal which overrides the fine error signal so that the coarse error signal is controlling until the fine error signal is close enough to final value to assume control, said means including means for converting the coarse error signal to a signal at a predetermined frequency and means responsive to said signal for providing a signal at said frequency and at a predetermined level when the signal from the converting means exceeds another predetermined level; and
   means for mixing the limited and modified signals to provide a driving signal.

2. A system as described by claim 1, wherein the means for mixing the limited and modified signals to provide a driving signal includes:
   means connected to the fine error signal limiting means and to the means responsive to the converted coarse error signal, and responsive to the limited fine error signal and the signal at the predetermined frequency and level for providing the driving signal.

3. A multi-speed servo system, comprising:

means for providing a coarse command signal;
means for providing a coarse feedback signal;
means for providing a fine command signal;
means for providing a fine feedback signal;
means connected to the fine command signal means and to the fine feedback signal means and responsive to the signals therefrom for providing a fine error signal;
means for limiting the fine error signal;
means connected to the coarse command signal means and to the coarse feedback signal means and responsive to the signals therefrom for providing a signal which overrides control by the fine error signal until said signal is close enough to final value to assume control, said means including first means responsive to the coarse command and feedback signals for providing a signal at a predetermined frequency and second means connected to the first means and responsive to the signal therefrom for providing a signal at said frequency and at a predetermined level when the signal from the first means exceeds another predetermined level; and
means for mixing the limited signal and the signal provided by the last mentioned means to provide a driving signal.

4. A system as described by claim 3, wherein the first means includes:
a first current flow control device having an input element connected to the coarse command signal means, a control element connected to a source of energizing voltage and an output element; and
a second current flow control device having an input element connected to the coarse feedback signal means, a control element connected to the source of energizing voltage and an output element connected to the output element of the first current flow control device.

5. A system as described by claim 4, wherein the first means includes:
an operational amplifier having an inverting input terminal, a non-inverting input terminal connected to the output elements of the first and second current flow control devices and an output terminal;
a first pair of current flow control devices connected in parallel opposing relation across the inverting input terminal and the output terminal; and
a second pair of current flow control devices connected in parallel opposing relation to the output terminal.

* * * * *

UNITED STATES PATENT OFFICE
CERTIFICATE OF CORRECTION

Patent No. 3,749,997          Dated  July 31, 1973

Inventor(s)  RICHARD L. COHEN, ET. AL.

It is certified that error appears in the above-identified patent and that said Letters Patent are hereby corrected as shown below:

In the Abstract, line 1, "Amu multi-speed" should read -- A multi-speed -- .

Signed and sealed this 22nd day of January 1974.

(SEAL)
Attest:

EDWARD M. FLETCHER, JR.            RENE D. TEGTMEYER
Attesting Officer                  Acting Commissioner of Patents